US007836203B2

(12) United States Patent
Tolliver

(10) Patent No.: US 7,836,203 B2
(45) Date of Patent: Nov. 16, 2010

(54) AUTOMATIC ROUTE SETUP VIA SNOOPING DYNAMIC ADDRESSES

(75) Inventor: Eric Tolliver, Moorpark, CA (US)

(73) Assignee: Alcatel Lucent, Paris (FR)

( * ) Notice: Subject to any disclaimer, the term of this patent is extended or adjusted under 35 U.S.C. 154(b) by 552 days.

(21) Appl. No.: 11/893,224

(22) Filed: Aug. 15, 2007

(65) Prior Publication Data

US 2009/0049191 A1 Feb. 19, 2009

(51) Int. Cl.
*G06F 15/173* (2006.01)
(52) U.S. Cl. .................................. 709/238; 709/220
(58) Field of Classification Search .............. 709/203, 709/217–229, 238–245
See application file for complete search history.

(56) References Cited

U.S. PATENT DOCUMENTS

| 7,542,572 | B2* | 6/2009 | Meier et al. ........... 380/277 |
| 7,548,523 | B2* | 6/2009 | Babbar et al. .......... 370/331 |
| 7,596,614 | B2* | 9/2009 | Saunderson et al. ..... 709/224 |
| 2002/0143787 | A1* | 10/2002 | Knee et al. ............ 707/102 |
| 2006/0149853 | A1* | 7/2006 | Shankara ............... 709/238 |

* cited by examiner

*Primary Examiner*—Yasin Barqadle
(74) *Attorney, Agent, or Firm*—Galasso & Associates, LP

(57) ABSTRACT

A routing device comprises a port accessible by a plurality of computers, processor-executable instructions configured for acquiring a DHCP-identified network address of a computer connected to the port in response to identifying the network address during monitoring of DHCP communication, and processor-executable instructions configured for configuring the port with an address route exclusive to the DHCP-identified network address in response to acquiring the DHCP-identified network address. Configuring the port includes creating a Classless Inter Domain Routing (CIDR) network address mask corresponding to the DHCP-identified network address and assigning the CIDR network address mask to the port.

15 Claims, 3 Drawing Sheets

AUTOMATIC ROUTE SETUP VIA SNOOPING DYNAMIC ADDRESSES

FIELD OF THE DISCLOSURE

The disclosures made herein relate generally to computer network systems and, more particularly, to facilitating route set-up in a computer network system.

BACKGROUND

In network installations, it is typically preferred for a networked computer (e.g., a personal computer (PC) within a computer network system) to not see any traffic from other networked computers. One solution to addressing this consideration is to set-up slash-30 (i.e., /30) routing. The 'slash' notation is known as the Classless Inter Domain Routing (CIDR) network address format. CIDR is a way to allocate and specify a network address (e.g., an Internet address) used in inter-domain router more flexibly than with the original system of Internet Protocol address classes.

Known approaches for setting up slash-30 routing exhibit a number of shortcomings. One such shortcoming is that it require manual configuration of each port. Such manual configuration is typically very time-consuming for reasons such as, for example, having to make sure all networked devices have a correct IP address. Another such shortcoming is that it requires intervention whenever a networked computer is moved from one port to another or when a new computer is added to the network. Still another shortcoming is that it requires giving fixed IP addresses to a computer attached to a port of a network (i.e., a networked computer).

Port mapping of each port is another known approach for addressing the consideration of not wanting a networked computer to see any traffic from other networked computers within a computer network. With respect to addressing such consideration, port mapping is a method of taking all of the traffic back to a central router that blocks traffic between ports having networked computers attached thereto. This puts the load on a backend router requiring all traffic to transverse the network. Undesirably, peer-to-peer communications is putting more pressure on the front-end switch to relieve the backend router of traffic, which is exactly opposite what port mapping does. Port mapping also has scaling problems to contend with. For example, as the network switch performing port mapping gets layered (i.e. multiple layer 2 hops), flooded traffic on the reverse path may still occur.

Therefore, an approach for substantially limiting, if not precluding, a networked computer from seeing any traffic from other networked computers within a computer network and which does so without introducing shortcomings associated with known approaches would be advantageous, desirable and useful.

SUMMARY OF THE DISCLOSURE

Dynamic Host Configuration Protocol (DHCP) is used widely to obtain a dynamic address. This allows network users to come and go on the network without requiring a network administrator to manually configure an IP address for each instance that a user connects to the network. Most commercially-available network routing devices snoop (i.e., monitor) DHCP communication in order to obtain the IP address assigned to the device. The term routing device is defined broadly enough herein to include network elements that provide routing and/or switching functionality (i.e., a switch, a router and the like).

Embodiments of implementations in accordance with the present invention are carried out upon the snooping of the IP address assignment. A routing device in accordance with the present invention then takes the snooped IP address and sets up a corresponding new route using a slash 30 (i.e., /30) or slash 31 (i.e., /31) mask. Such a route set-up mechanism allows the routing device to have its own subnet to reduce the amount of broadcast traffic it receives and to provide typical routing protections (e.g., blocking non-IP traffic). An advantage of the present invention is freedom from configuration as a user moves around in the network. Unlike group mobility, which allows Layer-2 auto configuration, the present invention can restrict all of the Layer-2 traffic from bleeding into other ports, thereby reducing security risks.

In one embodiment of the present invention, a method comprises a plurality of operations. An operation is performed for monitoring allocation of dynamic addresses on a port of a routing device. An operation is performed for acquiring an identified network address of a computer connected to the port in response to identifying the network address during monitoring of the dynamic address allocation. An operation is performed for configuring the port with an address route exclusive to the identified network address in response to acquiring the identified network address. Configuring the port includes creating a Classless Inter Domain Routing (CIDR) network address mask corresponding to the identified network address and assigning the CIDR network address mask to the port.

In another embodiment of the present invention, a set of processor-executable instructions includes instructions for carrying out route set-up in a routing device. Instructions are provided for i.) monitoring DHCP communication on a port of a routing device; ii.) acquiring a DHCP-identified network address of a computer connected to the port in response to identifying the network address during monitoring of the DHCP communication; iii.) enabling a Virtual Local Area Network (VLAN) identifier to be assigned to the port; iv.) creating a Classless Inter Domain Routing (CIDR) network address mask corresponding to the DHCP-identified network address in response to acquiring the DHCP-identified network address; and v.) enabling the CIDR network address mask to be assigned to the VLAN identifier.

In another embodiment of the present invention, a routing device comprises a port accessible by a plurality of computers, processor-executable instructions configured for acquiring a DHCP-identified network address of a computer connected to the port in response to identifying the network address during monitoring of DHCP communication, and processor-executable instructions configured for configuring the port with an address route exclusive to the DHCP-identified network address in response to acquiring the DHCP-identified network address. Configuring the port includes creating a Classless Inter Domain Routing (CIDR) network address mask corresponding to the DHCP-identified network address and assigning the CIDR network address mask to the port.

Thus, depending on the particular operating system of a routing device, route set-up functionality in accordance with the present invention can be implemented in several methods. In a first implementation, a VLAN is assigned to each instance of a networked computer being identified on a port of a routing device in a network. Combined with group mobility's capability to have multiple untagged VLANS in a port based on sub-address, this allows for multiple IP addresses to be routed on each port. Accordingly, in this first implementation, the routing device (e.g., a switch) captures each DHCP packet as it returns from the respective server. The routing device then takes an unused VLAN, assigns a route corresponding to the network address information in the DHCP packet, and assigns the VLAN to the port. Through normal routing protocols, this route is advertised to a remaining portion of the network, thereby providing full connectivity. In a second implementation, A VLAN is pre-assigned to each port. A server DHCP acknowledgement (ACK) packet is snooped to find new IP addresses. When a new IP address is identified through such snooping (i.e., monitoring), this IP address is then set-up as a new IP route as a multiple IP per VLAN. This implementation provides for a more static approach to VLAN. If used with a DHCP server that has pre-assigned IP addresses for a given MAC address, this would allow easy tracking of users through a campus setting, for example.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
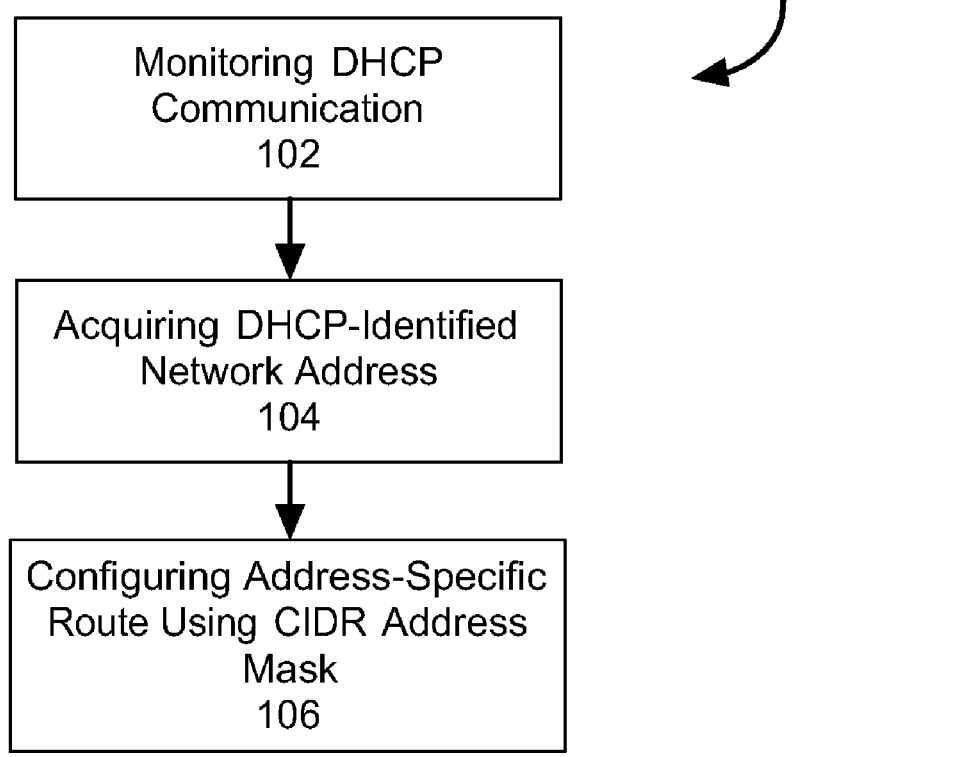
FIG. 1 shows an embodiment of a method for carrying out route set-up functionality in accordance with the present invention.

Referring to FIG. 1, an embodiment of a method for carrying out route set-up in accordance with the present invention (i.e., method 100) is shown. The method 100 begins with an operation 102 for monitoring DHCP communication on a port of a routing device. Monitoring DHCP communication is one example of monitoring allocation of dynamic addresses. An operation 104 is performed for acquiring a DHCP-identified network address of a computer connected to the port in response to identifying the network address during monitoring of the DHCP communication. An operation 106 is performed for configuring the port with an address route specific to the DHCP-identified network address in response to acquiring the DHCP-identified network address. In this manner, a route set-up mechanism is provided that precludes the need for manual configuration of ports and that reduces, if not eliminates, the amount of broadcast traffic a port sees while providing for typical routing protections.

Configuring the port includes creating a Classless Inter Domain Routing (CIDR) network address mask corresponding to the DHCP-identified network address and assigning the CIDR network address mask to the port. Preferably, creating the CIDR network address mask includes creating a CIDR slash-30 network address mask or a CIDR slash-31 network address mask. Furthermore, configuring the port is preferably performed automatically (i.e., without the need for human intervention) in response to acquiring the DHCP-identified network address.

Figure 2:
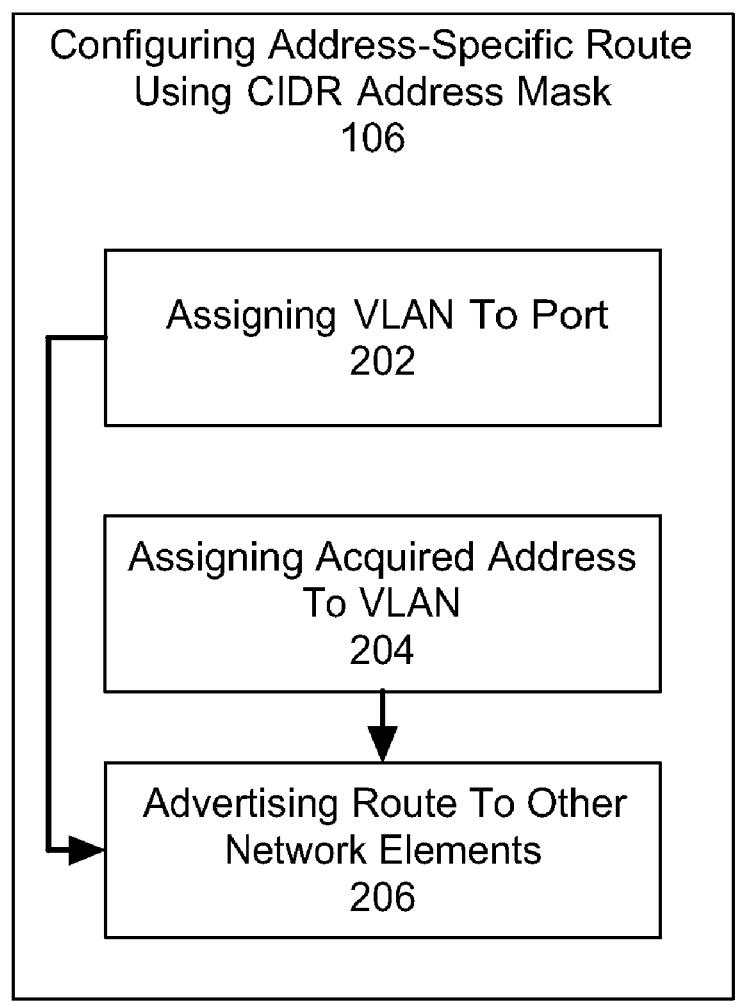
FIG. 2 shows an embodiment of an operation for configuring an address-specific route using a CDR address mask functionality in accordance with the present invention.

FIG. 2 shows an embodiment of performing the operation 106 for configuring the port with an address-specific route. A step 202 is performed for assigning a VLAN (i.e., VLAN identifier) to the port and a step 204 is performed for assigning the DHCP-identified network address (i.e., acquired address) to the VLAN. After assigning the VLAN to the port and assigning the DHCP-identified network address (i.e., acquired address) to the VLAN, a step 206 is performed for advertising the route corresponding to the VLAN, DHCP-identified network address and CIDR network address mask to other network elements. One implementation of configuring the port with an address-specific route includes determining an available Virtual Local Area Network (VLAN) identifier and assigning the CIDR network address mask to the VLAN identifier; and assigning the CIDR network address mask to the port includes assigning the VLAN identifier to the port. In this implementation, assigning the CIDR network address mask to the VLAN identifier can be performed prior to assigning the VLAN identifier to the port. Another implementation of configuring the port with an address-specific route includes pre-assigning the VLAN identifier to the port (e.g., assigned prior to monitoring DHCP communication on a port).

It is disclosed herein that a conventional router typically does not use VLANs. However, port-configuring functionality in accordance with the present invention can be implemented in a suitable manner by assigning routes directly to ports. Thus, the present invention is not limited to association of addresses or ports with a VLAN.

Figure 3:
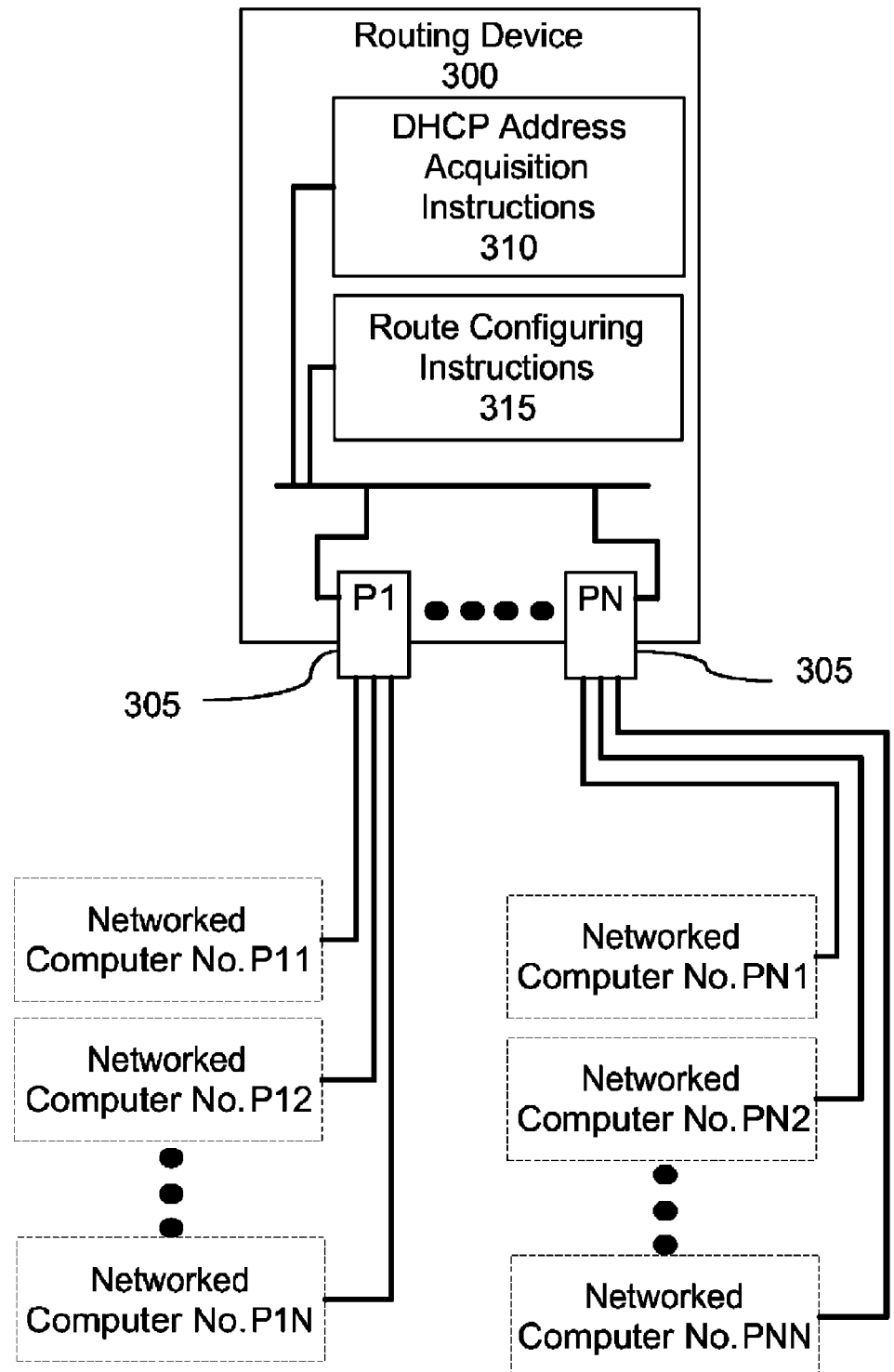
FIG. 3 shows an embodiment a routing device in accordance with the present invention.

Referring now to FIG. 3, an embodiment of a routing device in accordance with the present invention (i.e., routing device 300) is shown. The routing device 300 includes a plurality of ports 305 each accessible by a plurality of computers. The routing device 300 also includes processor-executable instructions 310 configured for acquiring a DHCP-identified network address of a computer connected to the port in response to identifying the network address during monitoring of DHCP communication. Still further, the routing device 300 includes processor-executable instructions 315 configured for configuring the port with an address route exclusive to the DHCP-identified network address in response to acquiring the DHCP-identified network address. Configuring the port includes creating a Classless Inter Domain Routing (CIDR) network address mask corresponding to the DHCP-identified network address and assigning the CIDR network address mask to the port. Jointly, the processor-executable instructions configured for acquiring the DHCP-identified network address and the processor-executable instructions configured for configuring the port can carryout all or selected portions of the route set-up functionality provided for by the method 100 discussed above in reference to FIGS. 1 and 2.

Referring now to instructions processable by a data processing device (i.e., processor-executable instructions), it will be understood from the disclosures made herein that methods, processes and/or operations adapted for carrying out route set-up functionality as disclosed herein are tangibly embodied by computer readable medium having instructions thereon that are configured for carrying out such functionality. In one specific embodiment, the instructions are tangibly embodied for carrying out the method 100 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out route set-up functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method, comprising:
    monitoring allocation of dynamic addresses on a port of a routing device, wherein said monitoring includes monitoring DHCP communication on the port of the routing device;
    acquiring a DHCP-identified network address of a computer connected to the port in response to identifying said network address during monitoring of said dynamic address allocation; and
    configuring the port with an address route exclusive to the identified network address in response to acquiring the DHCP-identified network address, wherein configuring the port includes creating a Classless Inter Domain Routing (CIDR) network address mask corresponding to the DHCP-identified network address and assigning the CIDR network address mask to the port, wherein configuring the port includes determining an available Virtual Local Area Network (VLAN) identifier and assigning the CIDR network address mask to the VLAN identifier and wherein assigning the CIDR network address mask to the port includes assigning said VLAN identifier to the port.

2. The method of claim 1 wherein creating the CIDR network address mask includes creating one of a CIDR slash-30 network address mask and a CIDR slash-31 network address mask.

3. The method of claim 1 wherein:
    monitoring allocation of dynamic addresses includes monitoring DHCP communication on the port; and
    the identified network address is a DHCP-identified network address.

4. The method of claim 3 wherein creating the CIDR network address mask includes creating one of a CIDR slash-30 network address mask and a CIDR slash-31 network address mask.

5. The method of claim 1 wherein:
    assigning the CIDR network address mask to the VLAN identifier is performed prior to assigning said VLAN identifier to the port.

6. The method of claim 1 wherein:
    determining said VLAN identifier and assigning said VLAN identifier to the port are performed prior to monitoring said dynamic address allocation such that said VLAN identifier is preassigned to the port; and
    assigning the CIDR network address mask to said VLAN identifier is performed in response to the CIDR network address mask being created.

7. The method of claim 1 wherein:
    monitoring allocation of dynamic addresses includes monitoring DHCP communication on the port; and
    the identified network address is a DHCP-identified network address.

8. The method of claim 1 wherein creating the CIDR network address mask includes creating one of a CIDR slash-30 network address mask and a CIDR slash-31 network address mask.

9. A non-transitory computer-readable storage medium having tangibly embodied thereon and accessible therefrom a set of instructions interpretable by at least one data processing device, said set of instructions configured for causing said at least one data processing device to perform:
    monitoring DHCP communication on a port of a routing device;
    acquiring a DHCP-identified network address of a computer connected to the port in response to identifying said network address during monitoring of said DHCP communication;
    enabling a Virtual Local Area Network (VLAN) identifier to be assigned to the port, wherein enabling the VLAN identifier to be assigned to the port includes enabling the VLAN identifier to be assigned to the port prior to monitoring said DHCP communication;
    creating a Classless Inter Domain Routing (CIDR) network address mask corresponding to the DHCP-identified network address in response to acquiring the DHCP-identified network address; and
    enabling the CIDR network address mask to be assigned to the VLAN identifier, wherein enabling the CIDR network address mask to be assigned to the VLAN identifier includes enabling the CIDR network address mask to be assigned to the VLAN identifier in response to the CIDR network address mask being created.

10. The non-transitory computer-readable storage medium of claim 9 wherein creating the CIDR network address mask includes creating one of a CIDR slash-30 network address mask and a CIDR slash-31 network address mask.

11. A routing device, comprising:
    a port accessible by a plurality of computers; and
    non-transitory computer-readable storage medium having tangibly embodied thereon and accessible therefrom instructions interpretable by at least one data processing device, said set of instructions configured for causing said at least one data processing device to perform:
    acquiring a DHCP-identified network address of a computer connected to the port in response to identifying said network address during monitoring of DHCP communication, and
    configuring the port with an address route exclusive to the DHCP-identified network address in response to acquiring the DHCP-identified network address, wherein configuring the port includes creating a Classless Inter Domain Routing (CIDR) network address mask corresponding to the DHCP-identified network address and assigning the CIDR network address mask to the port, wherein configuring the port includes determining an available Virtual Local Area Network (VLAN) identifier and assigning the CIDR network address mask to the VLAN identifier, and wherein assigning the CIDR network address mask to the port includes assigning said VLAN identifier to the port.

12. The routing device of claim 11 wherein creating the CIDR network address mask includes creating one of a CIDR slash-30 network address mask and a CIDR slash-31 network address mask.

13. The routing device of claim 11 wherein:
assigning the CIDR network address mask to the VLAN identifier is performed prior to assigning said VLAN identifier to the port.

14. The routing device of claim 11 wherein:
determining said VLAN identifier and assigning said VLAN identifier to the port are performed prior to monitoring said DHCP monitoring such that said VLAN identifier is preassigned to the port; and
assigning the CIDR network address mask to said VLAN identifier is performed in response to the CIDR network address mask being created.

15. The routing device of claim 11 wherein creating the CIDR network address mask includes creating one of a CIDR slash-30 network address mask and a CIDR slash-31 network address mask.

* * * * *